US010820178B2

(12) United States Patent
Fritz et al.

(10) Patent No.: US 10,820,178 B2
(45) Date of Patent: *Oct. 27, 2020

(54) SYSTEM AND METHOD FOR NOTIFICATION TRANSMISSION AND CONFIRMATION MANAGEMENT

(71) Applicant: Groupon, Inc., Chicago, IL (US)

(72) Inventors: Kyle Fritz, Baltimore, MD (US); Alex Sleighter, Chicago, IL (US); Lawrence Phipps, Chicago, IL (US); Oren Mittman, Chicago, IL (US); Ali Ibrahim, Chicago, IL (US)

(73) Assignee: Groupon, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/241,618

(22) Filed: Jan. 7, 2019

(65) Prior Publication Data
US 2019/0387381 A1 Dec. 19, 2019

Related U.S. Application Data

(63) Continuation of application No. 15/280,167, filed on Sep. 29, 2016, now Pat. No. 10,206,079.
(Continued)

(51) Int. Cl.
G06F 3/00 (2006.01)
H04W 4/70 (2018.01)
H04W 68/00 (2009.01)
G06F 11/07 (2006.01)
H04L 29/08 (2006.01)
(Continued)

(52) U.S. Cl.
CPC ........... *H04W 4/70* (2018.02); *G06F 11/0709* (2013.01); *G06F 11/0751* (2013.01); *G06F 11/0766* (2013.01); *G06F 11/0772* (2013.01); *H04L 51/30* (2013.01); *H04L 67/2823* (2013.01); *H04W 68/005* (2013.01); *G10L 13/00* (2013.01); *H04L 51/20* (2013.01); *H04L 67/18* (2013.01); *H04W 4/02* (2013.01)

(58) Field of Classification Search
CPC .................................................. G06F 11/0709
USPC .......................................................... 714/49
See application file for complete search history.

(56) References Cited

U.S. PATENT DOCUMENTS 8,271,006 B1 * 9/2012 Gilbert .............. H04M 3/42382
455/412.1
9,942,034 B2 4/2018 Le et al.
(Continued)

Primary Examiner — Chae M Ko
(74) Attorney, Agent, or Firm — Alston & Bird LLP

(57) ABSTRACT

An apparatus, method, and computer program product are provided to translate message objects received in connection with request data objects to be translated into notification objects that are in format that can be received and processed by a system associated with an intended recipient to allow for efficient communication across disparate and incompatible systems. In some example implementations, otherwise a translation system transforms request information based on parameters associated with the message object and intended recipient to ensure that request information is properly received by recipient systems that may use obsolete, legacy, and/or specialized systems. Some example implementations involve the application of error detection protocols and the display of notification object information on a user interface that allows for system monitoring and error mediation.

19 Claims, 4 Drawing Sheets

Related U.S. Application Data

(60) Provisional application No. 62/235,036, filed on Sep. 30, 2015.

(51) Int. Cl.
    *H04L 12/58*     (2006.01)
    *H04W 4/02*     (2018.01)
    *G10L 13/00*     (2006.01)

(56) References Cited

U.S. PATENT DOCUMENTS

| | | | | |
|---|---|---|---|---|
| 2006/0041470 | A1 | 2/2006 | Filho et al. | |
| 2006/0262851 | A1* | 11/2006 | Bakfan | G10L 19/00 375/240.12 |
| 2007/0165625 | A1 | 7/2007 | Eisner et al. | |
| 2009/0003247 | A1 | 1/2009 | Katis et al. | |
| 2012/0010923 | A1 | 1/2012 | Yarmolich | |
| 2012/0182939 | A1 | 7/2012 | Rajan et al. | |
| 2012/0210334 | A1 | 8/2012 | Sutedja et al. | |
| 2013/0282838 | A1* | 10/2013 | Zhu | H04L 51/12 709/206 |
| 2014/0244408 | A1 | 8/2014 | Grubel et al. | |
| 2015/0222572 | A1* | 8/2015 | Vendrow | H04L 51/02 715/752 |
| 2015/0278926 | A1 | 10/2015 | Fang et al. | |
| 2016/0036910 | A1 | 2/2016 | Spivey | |
| 2016/0037314 | A1 | 2/2016 | Lim | |
| 2016/0241389 | A1 | 8/2016 | Le et al. | |
| 2017/0024253 | A1 | 1/2017 | Ohmiya et al. | |
| 2017/0374434 | A1 | 12/2017 | Petrovic et al. | |
| 2018/0027395 | A1* | 1/2018 | Gupta | H04W 4/14 455/466 |
| 2019/0037439 | A1* | 1/2019 | Liu | H04L 61/2069 |

\* cited by examiner

SYSTEM AND METHOD FOR NOTIFICATION TRANSMISSION AND CONFIRMATION MANAGEMENT

CROSS-REFERENCE TO RELATED APPLICATIONS

This application is a continuation of U.S. application Ser. No. 15/280,167, filed Sep. 29, 2016, which claims the benefit of U.S. Provisional Patent Application Ser. No. 62/235,036, filed on Sep. 30, 2015, the entire contents of which are incorporated by reference herein for all purposes.

TECHNICAL FIELD

Example embodiments relate generally to the translation, mediation, and transmission of machine-to-machine system request messages and notifications across disparate, independent systems and the confirmation of the receipt of such notifications and other messages. Some example implementations particularly relate to the detection, management, and correction of transmission failures.

BACKGROUND

The widespread adoption of sophisticated mobile devices amongst the public, coupled with the increasing use by many systems of carefully curated, public-facing applications, websites, and other interfaces has given rise to an expectation amongst many users that requests and commands issued from a mobile device can be readily processed in a seamless fashion, regardless of the complexity, sophistication, compatibility, and/or independence of the multiple disparate systems that such request and commands implicate.

As with many technological advancements, the development, adoption, and deployment of technologies that are capable of readily processing requests and commands issued from mobile devices and/or other systems that are unrelated to and otherwise independent of the recipient system has been uneven across regions and industries. While many new communication protocols have emerged and become adopted in some areas, many legacy systems and communication protocols remain in use. As a result, the generation and transmission of messages from one system to intended recipients outside of that particular system must often contend with environments that include numerous disparate systems that are not fully compatible and have otherwise limited functionality. This widespread non-uniformity of system architecture, communication protocols, and functionality can be particularly problematic in contexts where the proper transmission and receipt of automated messages is highly time sensitive.

BRIEF SUMMARY

An apparatus, method, and computer program product are therefore provided in accordance with an example embodiment in order to provide for the management of message transmission and receipt confirmation. In this regard, the method, apparatus and computer program product of an example embodiment provide for the verification of communication between and amongst disparate systems using a variety of communication protocols.

In an example embodiment, an apparatus is provided that includes a processor and a memory, the memory comprising instructions that configure the apparatus to receive a message object associated with a request data object; extract from the message object a set of message payload information and a set of message parameter information, wherein the set of message payload information comprises a set of requirements associated with the request data object and wherein the set of message parameter information comprises: an identification of an intended recipient, an indication of a geographic location associated with the intended recipient, and an indication of a first electronic communication method associated with the intended recipient; store the extracted set of message payload information and the extracted set of message parameter information in a message data table; based at least in part on the extracted set of message parameter information, translate the message payload information, wherein translating the message payload information comprises transforming the requirements associated with the request data object into a predetermined format associated with the intended recipient; generate a notification object, wherein the notification object comprises the translated message payload information; and transmit the notification object to the intended recipient via the first electronic communication method.

In some example implementations of such an apparatus, the memory further comprises instructions that configure the apparatus to: receive an indication of an acceptance status of the notification object; generate a renderable object associated with the message object, the notification object, and the indication of the acceptance status of the notification object; and transmit a control signal causing the renderable object to be displayed on a user interface as a set of selectable objects. In some such example implementations, and in other example implementations, the set of message parameter information further comprises: a unique message identifier; a time parameter associated with the request data object; and an identification of a second electronic communication method associated with the intended recipient. In some such example implementations, and in other example implementations, memory further comprises instructions that configure the apparatus to detect an error condition associated with the acceptance status of the notification. In some such example implementations, and in other example implementations, the memory further comprises instructions that configure the apparatus to: based at least in part on detecting the error condition associated with the acceptance status of the notification, transmit the notification object to the intended recipient via the second electronic communication method.

In some example implementations of such an apparatus, transforming the requirements associated with the request data object into the predetermined format associated with the intended recipient comprises generating an audible message by applying a text-to-speech protocol to the requirements associated with the request data object. In some such implementations, and in other example implementations, transforming the requirements associated with the request data object into the predetermined format associated with the intended recipient comprises causing representations reflecting the requirements to be arranged in a predetermined region of a human-readable electronic message.

In another example embodiment, a computer program product is provided, wherein the computer program product includes at least one non-transitory computer-readable storage medium having computer-executable program code instruction stored therein, the computer-executable program code instructions comprising program code instructions configured to receive a message object associated with a request data object; extract from the message object a set of message payload information and a set of message parameter information, wherein the set of message payload information comprises a set of requirements associated with the request data object and wherein the set of message parameter information comprises: an identification of an intended recipient, an indication of a geographic location associated with the intended recipient, and an indication of a first electronic communication method associated with the intended recipient; store the extracted set of message payload information and the extracted set of message parameter information in a message data table; based at least in part on the extracted set of message parameter information, translate the message payload information, wherein translating the message payload information comprises transforming the requirements associated with the request data object into a predetermined format associated with the intended recipient; generate a notification object, wherein the notification object comprises the translated message payload information; and transmit the notification object to the intended recipient via the first electronic communication method.

In some example implementations, the computer-executable program code instructions further comprise program code instructions configured to: receive an indication of an acceptance status of the notification object; generate a renderable object associated with the message object, the notification object, and the indication of the acceptance status of the notification object; and transmit a control signal causing the renderable object to be displayed on a user interface as a set of selectable objects. In some such example implementations, and in other example implementations, the set of message parameter information further comprises: a unique message identifier; a time parameter associated with the request data object; and an identification of a second electronic communication method associated with the intended recipient. In some such example implementations, and in other example implementations, the computer-executable program code instructions further comprise program code instructions configured to detect an error condition associated with the acceptance status of the notification. In some such example implementations and in other example implementations, the computer-executable program code instructions further comprise program code instructions configured to: based at least in part on detecting the error condition associated with the acceptance status of the notification, transmit the notification object to the intended recipient via the second electronic communication method.

In some example implementations of such a computer program product, transforming the requirements associated with the request data object into the predetermined format associated with the intended recipient comprises generating an audible message by applying a text-to-speech protocol to the requirements associated with the request data object. In some such example implementations, and in other example implementations, transforming the requirements associated with the request data object into the predetermined format associated with the intended recipient comprises causing representations reflecting the requirements to be arranged in predetermined regions of a human-readable electronic message.

In another example embodiment, a method for managing the transmission and confirmation of machine-generated messages is provided, the method including receiving a message object associated with a request data object; extracting from the message object a set of message payload information and a set of message parameter information, wherein the set of message payload information comprises a set of requirements associated with the request data object and wherein the set of message parameter information comprises: an identification of an intended recipient, an indication of a geographic location associated with the intended recipient; and an indication of a first electronic communication method associated with the intended recipient; storing the extracted set of message payload information and the extracted set of message parameter information in a message data table; based at least in part on the extracted set of message parameter information, translating the message payload information, wherein translating the message payload information comprises transforming the requirements associated with the request data object into a predetermined format associated with the intended recipient; generating a notification object, wherein the notification object comprises the translated message payload information; and transmitting the notification object to the intended recipient via the first electronic communication method.

In some example implementations, the method further comprises receiving an indication of an acceptance status of the notification object; generating a renderable object associated with the message object, the notification object, and the indication of the acceptance status of the notification object; and transmitting a control signal causing the renderable object to be displayed on a user interface as a set of selectable objects. In some such example implementations and in other example implementations, the set of message parameter information further comprises: a unique message identifier; a time parameter associated with the request data object; and an identification of a second electronic communication method associated with the intended recipient. In some such example implementations and in other example implementations, the method further comprises: detecting an error condition associated with the acceptance status of the notification; and based at least in part on detecting the error condition associated with the acceptance status of the notification, transmit the notification object to the intended recipient via the second electronic communication method.

In some example implementations of such a method, transforming the requirements associated with the request data object into the predetermined format associated with the intended recipient comprises generating an audible message by applying a text-to-speech protocol to the requirements associated with the request data object. In some such example implementations and in other example implementations, transforming the requirements associated with the request data object into the predetermined format associated with the intended recipient comprises causing representations reflecting the requirements to be arranged in a predetermined region of a human-readable electronic message.

BRIEF DESCRIPTION OF THE DRAWINGS

Figure 1:
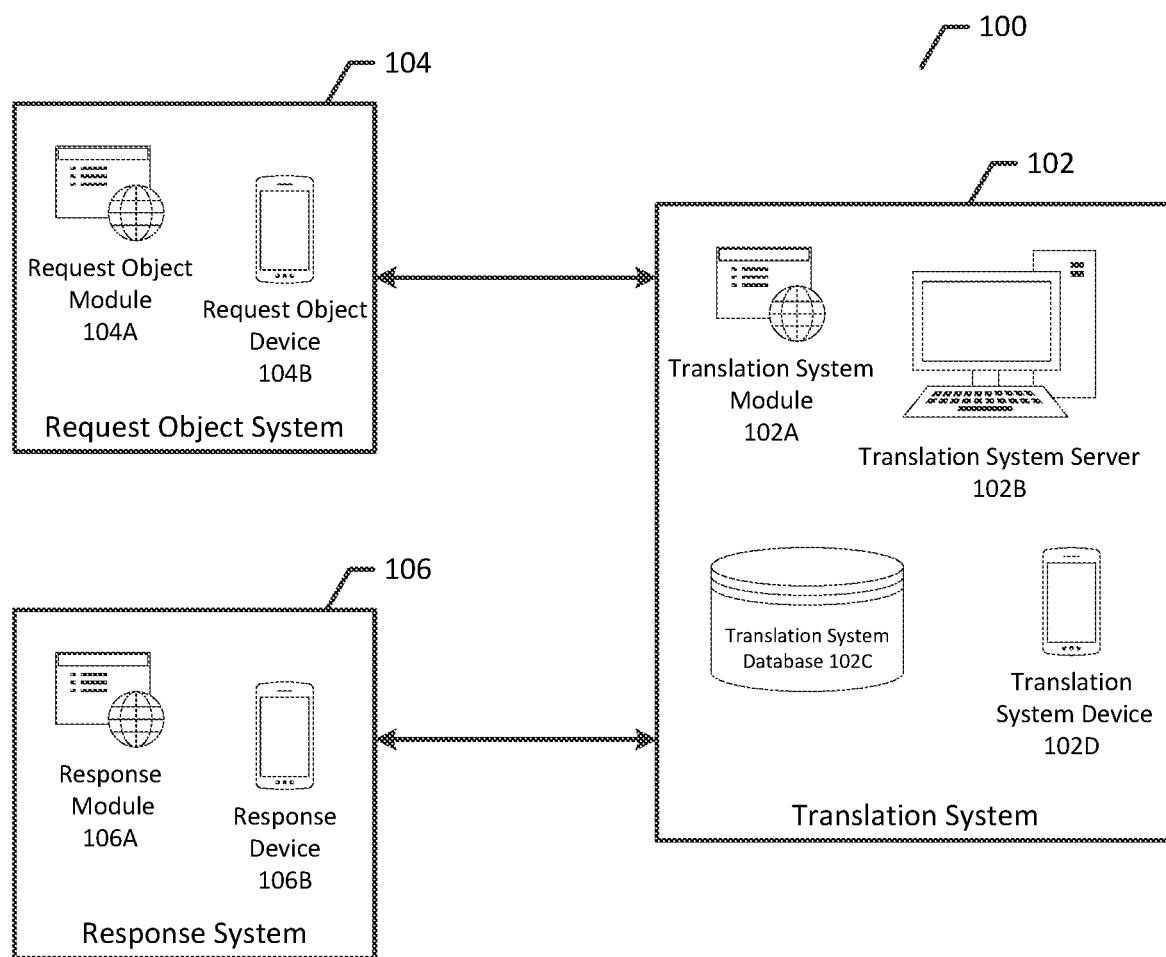
Figure 2:
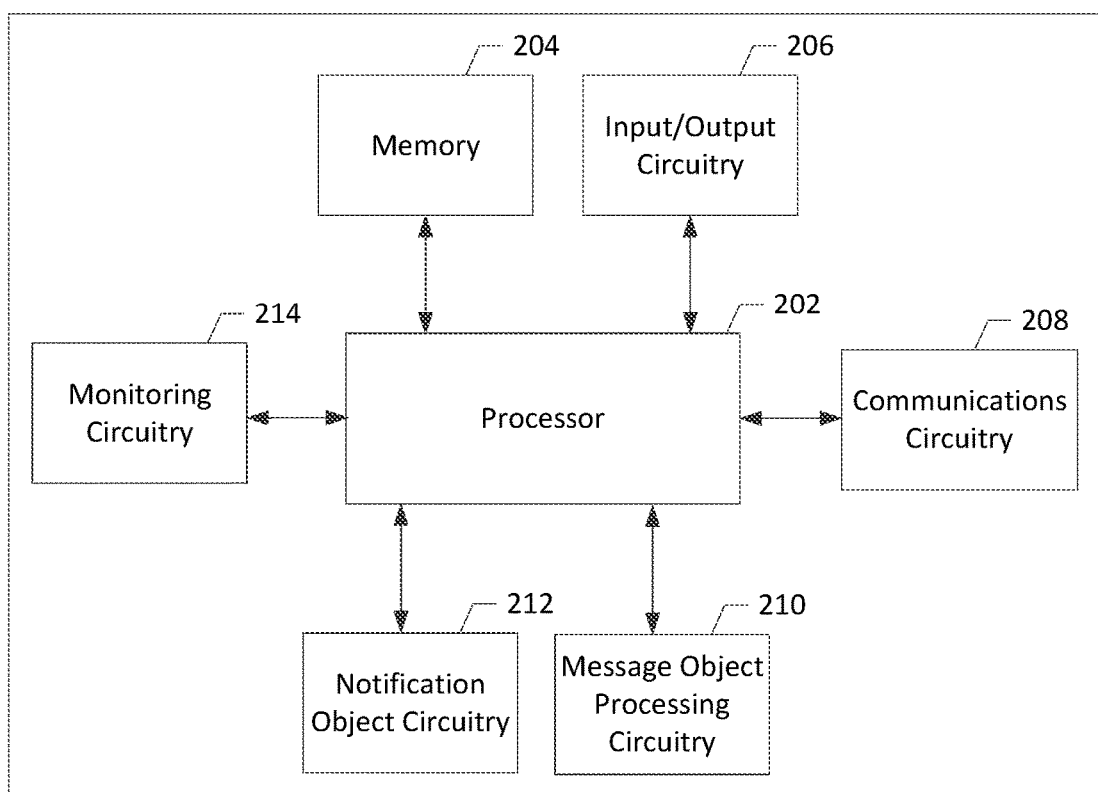
Figure 3:
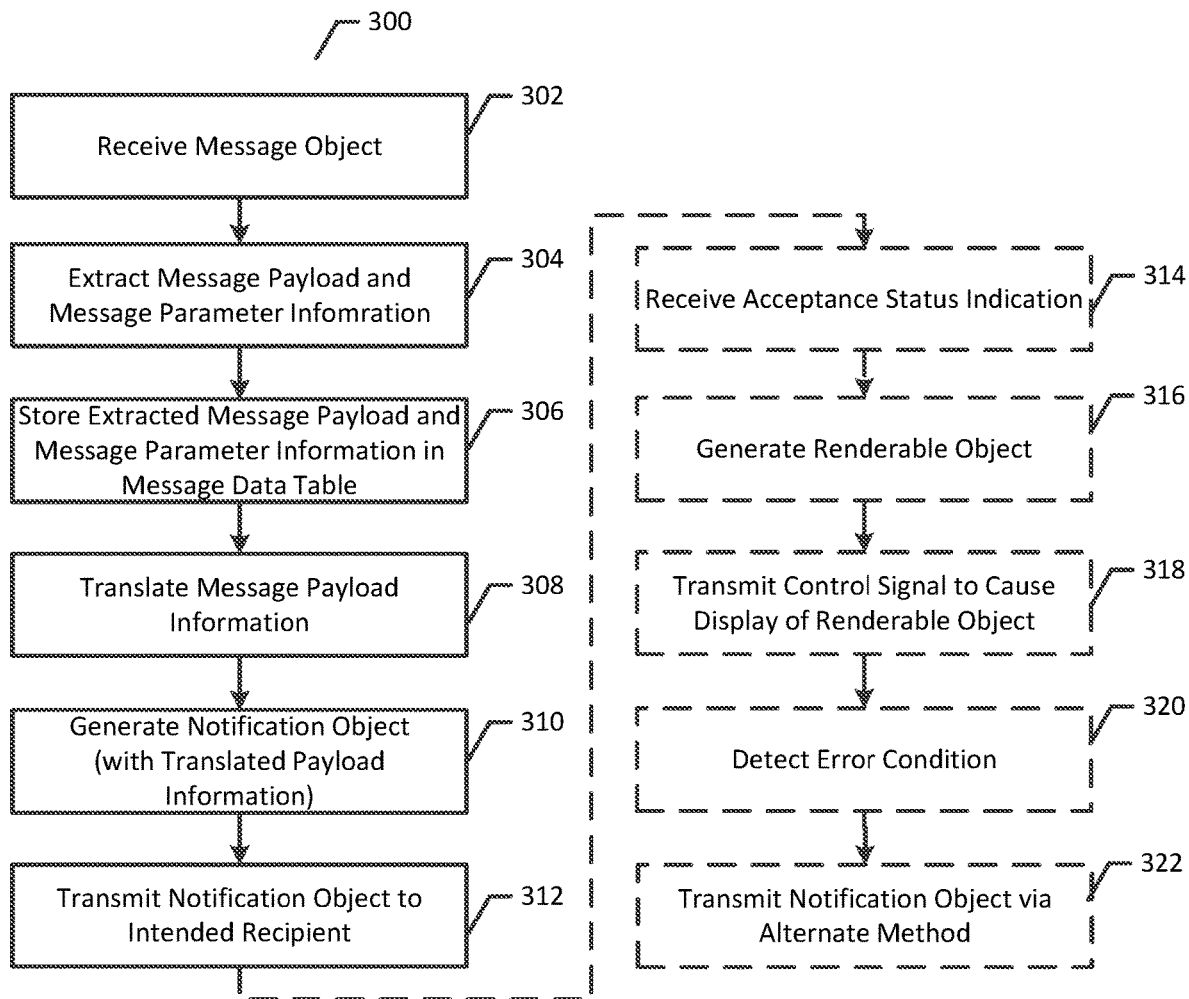
Figure 4:
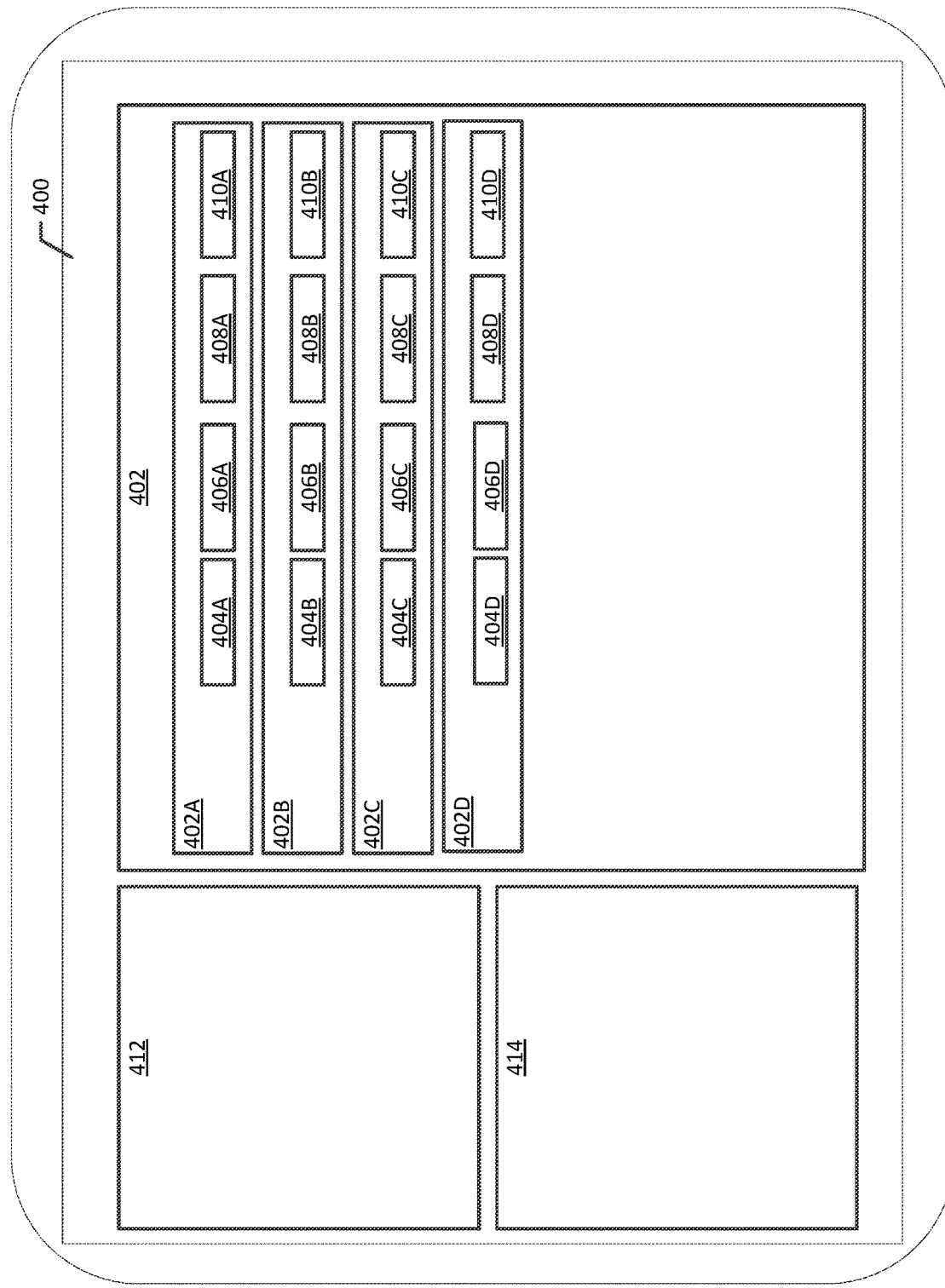

Having thus described certain example embodiments of the present disclosure in general terms, reference will hereinafter be made to the accompanying drawings, which are not necessarily drawn to scale, and wherein:

FIG. 1 depicts an example system environment in which implementations in accordance with an example embodiment of the present invention may be performed;

FIG. 2 is a block diagram of an apparatus that may be specifically configured in accordance with an example embodiment of the present invention;

FIG. 3 is a flowchart illustrating a set of operations performed, such as by the apparatus of FIG. 2, in accordance with an example embodiment of the present invention; and FIG. 4 is a simplified diagram of a display of a user interface that may be generated and used in accordance with an example embodiment of the present invention.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

As used herein, a "request data object" or "request object" is any data object that contains a request from a user or other entity for access to and/or use of system resources and an indication of the requirements and/or other parameters associated with the request.

As used herein, a "message object" is a data object that is associated with a request data object and contains information meant to be conveyed from one system to another. Some example implementations of a message object are structured such that the message object contains a message payload, which may include, for example, the primary information to be conveyed. In some example implementations, a message object may also contain a set of message parameter information, which may include, for example, data or metadata associated with the message payload and/or the request data object with which the message object is associated. In the example implementations described herein, the term "message object", "message", and/or other "message"—formative terms may refer to information associated with a request data object prior to the translation of such information into a format that can be properly received by a system associated with the intended recipient.

As used herein, a "notification object" is a data object that is associated with a request data object and/or a message object, and contains information in a format that can be properly received by a system associated with an intended recipient of a message payload and/or other aspects of a message object. In the example implementations described herein, the term "notification object", "notification" and/or other "notification"—formative terms may refer to information associated with a request data object after the translation of such information into format that can be properly received by a system associated with the intended recipient.

An apparatus, method, and computer program product are provided in accordance with example embodiments in order to manage the transmission of message objects between and across systems and confirm the receipt of notification objects associated with such message objects. Many of the example embodiments and implementations described or otherwise contemplated herein arise in the context of systems that automatically received, generate and transmit high volumes of request data objects and related message objects that are time-sensitive, at least in the sense that the message objects are intended to trigger a response by the intended recipient that fulfills the requirements of the underlying request data object within a relatively limited timeframe.

In environments where multiple systems and/or system components are independent of each other, such as when systems and/or system components are operated or controlled by unrelated entities, inter-system communication is often impeded by incompatibilities amongst systems or system components. Limitations or inconsistencies in system capabilities and differences in useable communication protocols also act to impede the ability to confirm that a message object has arrived at a system associated with an intended recipient via a communication pathway that can be accessed by the intended recipient and in a format that the intended recipient is capable of processing.

While many transmission systems are generally capable of determining and/or confirming that a message has been sent, conventional systems operating in environments that feature multiple independent systems or system components are generally incapable of confirming that the content of a message has been received by an intended recipient. Moreover, the ability to detect when message object content has failed to be received by the intended recipient, diagnose one or more causes of such failure, and/or determine alternative transmission options is significantly curtailed in such non-uniform network environments. These issues can be particularly problematic in contexts where the message is time sensitive, such as when the message is intended to trigger a responsive action by the intended recipient within a particular window of time.

Implementations of the example embodiments disclosed herein address these and other issues by processing and transforming message objects and related information to generate notifications that are in a predetermined format associated with the intended recipient of the message, and transmitting transformed notifications to the intended recipient. Upon receipt of a message object and/or set of information associated with a message by a message translation system, the message translation system parses the message information to extract the message payload information and a set of message parameter information that may be included with the received message object or otherwise associated with the message object. This extracted information can be stored in a database, such as one or more message data tables that are incorporated into or otherwise in communication with the message translation system.

Based at least in part on protocols established between the message translation system and the intended recipient of the message, a notification object is generated by transforming at least a portion of the extracted message information into a predetermined format associated with the intended recipient, and transmitting the notification object to the intended recipient via an electronic communication method, such as phone, fax, and/or email. In some example implementations, after transmission of the notification object, the message translation system may further manage the messaging and notification process by monitoring and/or receiving an indication of the acceptance status of the transmitted notification object. In situations where proper receipt of the notification object by the intended recipient cannot be confirmed, and/or upon detecting an error in the transmission of the notification object, such through the receipt of a busy signal, error code, failure to receive a confirmation message, or the like, the message translation system can take steps to remedy the error, such as by transmission of the notification object (and/or a modified notification object) by an alternate method, and/or attempting other contact with the intended recipient.

Many particularly advantageous implementations contemplate the display of a user interface, the generation of which involves the creation of renderable objects associated with a message object, a related notification object, and/or an indication of the acceptance status of the notification object and causing such renderable objects to be presented on a user interface as a set of selectable objects, the selection of which may allow an operator and/or other user of the interface to interact with the underlying message object, notification object, and/or any other related information and attempt to address error conditions. Such a user interface may permit the rapid monitoring of status information associated with multiple message objects and notification objects. In many situations, it may be beneficial to implement a user interface that allows a user to view and modify all and/or a substantial portion of the information associated with a message object and/or its related request data object, including the content of the message payload and/or message parameter information and the status information associated with the notification objects. In some implementations, the information is arranged in a manner that allows a single user to view and monitor information associated with multiple message objects and/or multiple notification objects simultaneously. Moreover, the user interface may also permit a user to take additional actions, such as initiating communication with the individual or entity that generated the message object and/or its underlying request data object, and/or the intended recipient. In some situations, it may be beneficial to implement the interface such that a user is able to use the interface to control other aspects of the message translation system, and/or other systems that interface with the message translation system, such as the particular network interfaces or other equipment provided by the operators of networks through which the message translation system receives message objects and transmits notification objects and/or other communications.

Turning now to the Figures, FIG. 1 shows an example system environment 100 in which implementations involving the efficient translation of message objects into notification objects that can be properly received and processed by system associated with an intended recipient may be performed. The depiction of environment 100 is not intended to limit or otherwise confine the embodiments described and contemplated herein to any particular configuration of elements or systems, nor is it intended to exclude any alternative configurations or systems for the set of configurations and systems that can be used in connection with embodiments of the present invention. Rather, FIG. 1, and the environment 100 disclosed therein is merely presented to provide an example basis and context for the facilitation of some of the features, aspects, and uses of the methods, apparatuses, and computer program products disclosed and contemplated herein. It will be understood that while many of the aspects and components presented in FIG. 1 are shown as discrete, separate elements, other configurations may be used in connection with the methods, apparatuses, and computer programs described herein, including configurations that combine, omit, and/or add aspects and/or components.

Embodiments implemented in a system environment such as system environment 100 advantageously provide for the generation and transmission to an intended recipient of one or more notification objects through the receipt and extraction of message object payload and/or parameter information the translation of such information into a predetermined format associate with the intended recipient. Some such embodiments further contemplate the monitoring of an acceptance status of a transmitted notification object and/or the detection of errors associated with the transmission and/or receipt of a notification object. Some particularly advantageous implementations of embodiments that implicate system environment 100 further provide for the rendering of selectable objects associated with message objects, notification objects, and/or related information to facilitate the monitoring and interaction with such objects and/or information. Some such embodiments leverage a hardware and software arrangement or environment for message object translations and notification generation and monitoring in accordance with the present invention.

As shown in FIG. 1, an object translation system 102 includes an online translation system module 102A which is configured to receive, process, transform, transmit, communicate with and evaluate message objects and/or their related request data objects, response systems (such as those associated with intended recipients of message objects and notification objects, and data and systems associated therewith) via a web server, such as translation system server 102B and/or object translation system device 102D. The translation system server 102B is connected to any of a number of public and/or private networks, including but not limited to the Internet, the public telephone network, and/or networks associated with particular communication systems or protocols, and may include at least one memory for storing at least application and communication programs.

It will be appreciated that all of the components shown FIG. 1 may be configured to communicate over any wired or wireless communication network including a wired or wireless local area network (LAN), personal area network (PAN), metropolitan area network (MAN), wide area network (WAN), or the like, as well as interface with any attendant hardware, software and/or firmware required to implement said networks (e.g. network routers and network switches). For example, networks such as a cellular telephone, an 802.11, 802.16, 802.20 and/or WiMax network, as well as a public network, such as the Internet, a private network, such as an intranet, or combinations thereof, and any networking protocols now available or later developed including, but not limited to TCP/IP based networking protocols may be used in connection with system environment 100 and embodiments of the invention that may be implemented therein or participate therein. However, it will also be appreciated that many implementations of embodiments of the invention arise in contexts where the particular connectivity protocols and other technology associated with one or more request object systems may be incompatible with the particular connectivity protocols and related technology used by a response system associated with a particular intended recipient. Likewise, some implementations of embodiments of the invention arise in contexts where a mismatch between request data object systems and response systems limits and/or otherwise impedes the ability for such systems to directly communicate with each other.

As shown in FIG. 1, object translation system 102 also includes a translation database 102C that may be used to store information associated with request data objects, message objects, notification objects, response systems, and/or information related to the receipt, translation, transmission, and/or monitoring of such objects and systems, which can be accessed by the translation system module 102A, the translation system server 102B, and/or the translation system device 102D. While FIG. 1 depicts translation system database 102C as a single structure, it will be appreciated that translation system database 102C may additionally or alternatively be implemented to allow for storage in a distributed fashion and/or at facilities that are physically remote from the each other and/or the other components of object translation system 102. Object translation system 102 is also shown as including object translation system device 102D which may take the form of a laptop computer, desktop computer, or mobile device, for example, to provide an additional means (other than via a user interface of the object-asset monitoring system server 102B) to interface with the other components of object translation monitoring system 102 and/or other components shown in or otherwise contemplated by system environment 100.

Request data objects, related message objects, and/or additional information to be associated with one or more request data objects or message objects may originate from a client system such as request object system 104. A user of request object system 104 may use a request object device 104B, such as a laptop computer, desktop computer, or mobile device, for example, to interface with a request object module 104A to generate a request data object, a message object and/or information to be included in a request data object or message object, such as instruction associated with the request data object, intermediate and/or target destinations associated with the request object, and/or other information to be conveyed from a user as part of a request for a response to be conveyed to an intended recipient via an object translation system, such as object translation system 102. While only one request object system 104 is depicted in FIG. 1 in the interest of clarity, it will be appreciated that numerous other such systems may be present in system environment 100, permitting numerous users to develop and transmit request data objects and/or related message objects to the object translation system 102.

As shown in FIG. 1, system environment 100 also includes response system 106, which comprises a response module 106A and a response device 106B. While only one response system 106 is depicted in FIG. 1 in the interest of clarity, it will be appreciated that numerous additional such systems may be present in system environment 100, permitting numerous, different and independent response systems to be used by intended recipients of message objects and their related notification objects. Response device 106B may comprise and/or incorporate a laptop computer, desktop computer, mobile device, telephone, fax machine, or the like, for example, and is configured to interface with a response asset module 106A to interact with object translation system 102 to receive and operate on notification objects directed to intended recipients associated with such response systems. The response system 106 is also capable of communicating with object translation system 102 to provide information that the object translation system 102 may need when generating a notification object, determining the status of the response system and/or notification objects sent to the response system, detecting and addressing errors associated with the transmission and receipt of notification objects and related information, and causing such information to be rendered on a user interface. Such information may include, but is not limited to the communication methods suitable for use with the response system, particular formats to be used in connection with notification objects, confirmation indicia and/or other information associated with the receipt of notification objects, and the like, for example.

Overall, and as depicted in system environment 100, object translation system 102 engages in machine-to-machine communication with request object system 104 and response system 106, via a network, to facilitate timely processing of message objects and the transmission of notification objects to their intended recipients. In particular, a mobile device, such as request object device 104B can be configured to communicate a message object and/or content to be included in a message object to the message translation system 102, where the message translation module 102A, in conjunction with the other components of message translation system 102, transform and transmit the message information as a notification object to the response system 106 via email, phone, fax, or other messaging protocol. The message translation module 102A is also configured, along with the other components of message translation system 102, to confirm the acceptance status of the notification object and detect errors in the receipt of the notification object by the response system 106. Moreover, the message translation system 102 is also configured to communicate with the request object system 110 to provide information about the status of the transmitted notification object and any request contained therein. Thus, the system facilitates efficient message object transactions by providing communications in a predictable, verifiable, and useable manner to an intended recipient, while alleviating the need for the recipient to monitor traffic from multiple disparate systems that may not be compatible with the response system on the intended recipient. Moreover, by providing a central hub through which communication is mediated, the message translation system permits the generation of a user interface that allows a user to monitor, verify, and intervene in the operation of the message translation system.

FIG. 2 illustrates a block diagram of an apparatus 200 in accordance with some example embodiments. The apparatus 200 may be any computing device capable of translating message objects and generating notification objects as described herein. For example, the apparatus 200 may be implemented as any device capable of programmatic detection of transmission status, detection of transmission errors, and display and/or other processing of message errors. The apparatus 200 may be embodied by the object translation system 102, or any of the components shown or otherwise contemplated therein, any of the other devices discussed with respect to FIG. 1, and/or any other devices that may be incorporated or otherwise associated with environment 100. Alternatively, the apparatus 200 may be embodied by another computing device, external to such devices. For example, the apparatus may be embodied by a personal computer, a computer workstation, a server or the like, or by any of various mobile computing devices, such as a mobile terminal, e.g., a smartphone, a tablet computer, etc.

The apparatus 200 may also be configured to provide one or more graphical user interfaces (GUIs) to provide a dynamic interface that displays the status of particular messages and related notifications. In some embodiments, the apparatus 200 may include a display and input devices (e.g., mice, keyboards, touch screens, etc.) for providing the one or more GUIs, while in other embodiments the apparatus 200 may function as a server providing the graphical user interface to another apparatus which functions as a client device (e.g., where the server provides remote access capabilities such as over a network). In the interests of brevity, the apparatus 200 is described as both generating a GUI and receiving inputs to the GUI, but it should be readily appreciated that the GUI may, in some embodiments, be provided to a separate client device by the apparatus and input may be provided via the client device and routed to the apparatus via various types of data connections (e.g., wirelessly, through WiFi or Bluetooth, over Ethernet, via parallel or serial cables, via a Universal Serial Bus (USB) cable, or any other communication method). Regardless of the precise implementation and form of the apparatus 200, it will be appreciated that the apparatus 200 may comprise an apparatus configured to implement and/or otherwise support implementation of various example embodiments described herein. It will be appreciated that the components, devices or elements illustrated in and described with respect to FIG. 2 below may not be mandatory and thus some may be omitted in certain embodiments. Additionally, some embodiments may include further or different components, devices or elements beyond those illustrated in and described with respect to FIG. 2.

As illustrated in FIG. 2, an apparatus 200 may include a processor 202, a memory 204, input/output circuitry 206, communications circuitry 208, message object processing circuitry 210, notification object circuitry 212, and monitoring circuitry 214. The apparatus 200 may be configured to implement the interfaces described below. Although these components 202-214 are described with respect to functional limitations, it should be understood that the particular implementations necessarily include the use of particular hardware. It should also be understood that certain of these components 202-214 may include similar or common hardware. For example, two sets of circuitry may both leverage use of the same processor, network interface, storage medium, or the like to perform their associated functions, such that duplicate hardware is not required for each set of circuitry. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, tables, data structures, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The message object processing circuitry 210 includes hardware configured to interface with one or more request object systems and/or related databases to receive incoming message objects parse such message objects and/or otherwise extract information from message objects, and/or add the incoming message objects and related information to a messages table or other database. The message object processing circuitry 210 may be configured to identify particular portions of the content of the message generated by a client, identify a particular intended recipient of the message, and store the message in a format suitable for transmission to a dispatch service (not shown) for assignment to an entity responsible for fulfilling one or more requests contained within the message object and/or its related request data object. The message object processing circuitry 210 may include one or more processors and memories to facilitate these tasks, such as the processor 202 and the memory 204. In some embodiments, the message object processing circuitry 210 sends an event or other communication to the notification object circuitry 212 to facilitate the ongoing translation, monitoring, dispatch, and processing of the message object.

The notification object circuitry 212 includes hardware configured to cause notification objects to be sent to an intended recipient and/or system that will interface with the intended recipient to fulfill a request or command contained within a message, and/or monitoring circuitry to monitor the status of the notification object. In some embodiments, the notification object circuitry 212 includes communications hardware such as a network interface card or fax modem to transmit notification objects to the intended recipient or related response system. The notification object circuitry 212 may provide status updates and/or error codes for notification objects, and store those status updates and/or notification objects in a table with a message object. The notification object circuitry 212 may also include one or more processes or threads executing on a processor, such as the processor 202 to facilitate management of notification objects sent to intended recipients and/or related systems in accordance with embodiments of the present invention.

The monitoring circuitry 214 includes hardware configured to monitor the status of message objects received by the message object processing circuitry 210, notification objects transmitted in conjunction with notification object circuitry 212 and to generate an interface that reports the status of these notification objects and message objects. The monitoring circuitry 214 may, for example, access a data table comprising each message object, notification object, and any status updates provided to or by the notification object circuitry 212, such as error states (e.g., failure by an intended recipient to acknowledge a notification or request contained therein, a report of a fax machine error on transmission, or the like). The monitoring circuitry 214 may generate a user interface that includes real time or near-real time notification object statuses (e.g., confirmations and/or error conditions) to provide a user with information on whether and when to follow up with an intended recipient to confirm or verify receipt of a notification object. The monitoring circuitry 214 may include a display device, input devices and the like, though in some embodiments the communications circuitry 208 and the input/output circuitry 206 may be leveraged to perform these functions.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Having now described an apparatus configured to perform and/or support implementation of various example embodiments, features of several example embodiments will now be described. It will be appreciated that the following features are non-limiting examples of features provided by some example embodiments. Further, it will be appreciated that embodiments are contemplated within the scope of disclosure that implement various subsets or combinations of the features further described herein. Accordingly, it will be appreciated that some example embodiments may omit one or more of the following features and/or implement variations of one or more of the following features.

Many example implementations are particularly advantageous in environments and contexts that involve multiple, independent systems and/or related entities sending requests for service and/or resources in the form of message objects and/or related request data objects to multiple, independent service providers. In such contexts, the impediments to reliable communication inherent in multi-source, multi-platform communication can be reduced or eliminated by the use of the object translation-related embodiments described herein. One such environment and context involves customers who seek to remotely place orders with restaurants and receive the ordered items via a delivery service. Consequently, several example implementations are described herein in such a context for purposes of providing illustrative examples of aspects of embodiments of the invention. However, it will be appreciated that the concepts disclosed and discussed herein, particularly with regards to message management, error detection and correction, and providing a display regarding such features, are applicable in numerous other contexts and should not be considered to be limited by the particular examples presented herein.

FIG. 3 is a block diagram illustrating a set of operations 300 performed, such as by the apparatus 200 of FIG. 2, in accordance with an example embodiment of the present invention. It will be appreciated that the apparatus 200, through the operation of the processor 202 and/or any other components or other circuitry contained therein or used in conjunction therewith, is capable of performing each of the operations described herein with respect to FIG. 3 and depicted or otherwise contemplated herein.

As such, and as shown at block 302, the apparatus 200 is capable of receiving a message object associated with a request data object. As discussed elsewhere herein, a message object is a data object that is associated with a request data object and contains information meant to be conveyed from one system to another, and a request data object is any data object that contains a request from a user or other entity for access to and/or use of system resources and an indication of the requirements and/or other parameters associated with the request. Some example implementations of block 302 arise in contexts where the message object and the request data object include, but are not necessarily limited to, requests that a response system prepare and/or provide goods, materials, and/or other resources to a requestor or other entity associated with the request data object and the message object, so as to effectuate and participate in the timely delivery of goods, materials, and/or other resources to a particular location. In some such example implementations, a message object associated with a request data object may be transmitted by a mobile device associated with a user, such as request object device 104B shown in FIG. 1, or the like, directly to the apparatus 200 and/or indirectly, such as through an object translating system, such as object translating system 102, that may be associated with the apparatus 200. Any approach to generating a message object and/or a request data object and any approach to receiving such a message object associated with a request data object may be used in connection with implementations of block 302.

As shown at block 304, the apparatus 200 is also capable of extracting from the message object a set of message payload information and a set of message parameter information. In implementations of block 304, the set of message payload information includes, but is not limited to, a set of requirements associated with the request data object. In example implementations that arise in the context of remote ordering from a restaurant, the set of requirements may be a listing of the ordered food items and any particularized instructions regarding the preparation of the ordered food items. In implementations of block 304, the set of message parameter information may include, but is not limited to, an identification of an intended recipient (such as a name, phone number, email address, unique identifier that has been previously assigned to the intended recipient, or the like, for example), an indication of a geographic location associated with the intended recipient (such as an address, neighborhood or city name, coordinates, or other indicia of a geographic location, for example), and an indication of a first electronic communication method associated with the intended recipient. In most implementations of block 304, the indication of the first electronic communication method will include an identification of an intended recipient's preferred method for receiving notification objects, such as via email, fax, and/or over a telephonic call. In some example implementations of block 304, the set of message parameter information may also include a unique message identifier, which may be appended to a message object by the apparatus 200 and/or a related system and serves to identify each particular message object received by a system. In some example implementations, the message parameter information may include a time parameter associated with the request data object, such as a time when the requirements of the request data object need to be fulfilled. In some example implementation of block 304, a second electronic communication method is identified, such that notification objects can be sent in parallel via multiple methods, or such that backup method can be used in situations where error conditions are associated with attempted transmissions of notification objects in accordance with a first identified communication method. Any approach to extracting the set of payload information and set of message parameter information may be used in implementations of block 304, and the selection of such approach may be dependent, at least in part, on the precise format in which the message object is received.

As shown in block 306, the apparatus 200 is also capable of storing the extracted set of message payload information and the extracted set of message parameter information in a message data table. In some example implementations of block 306, a database, such as the memory 204 and/or translation system database 102C or the like may be used to implement a message data table that may be used to store the sets of information extracted from a message object. Particularly in contexts that contemplate extensive processing to translate a message object into a notification object suitable for receipt by the intended recipient, storing pre-processed versions of the extracted message data may be advantageous, at least to the extent that it provides a version of the received message object information that can be reprocessed in the event of a translation error or other error condition.

As shown in block 308, the apparatus 200 is also capable of translating the set of extracted message payload information based at least in part on the set of extracted message parameter information. In implementations of block 308, translating the set of extracted message payload information includes, but is not necessarily limited to, transforming the requirements associated with the request data object into a predetermined format associated with the intended recipient. Some example implementations of block 308 arise in contexts where the menu system and/or other interface used to capture the requirements associated with a request data object and its related message object provides the requirements in a format that are neither human readable nor directly recognizable to a system associated with the intended recipient. For example a menu interface may generate a series of numeric codes, an unstructured list, and/or other indicia. As such, implementations of block 308 contemplate having previously received an indication of the format in which an intended recipient wishes to receive request requirements, and causing the incoming information from a message object translated into that format. Since most implementations of process 300 contemplate an identification of the intended recipient being included in the message parameter information, that extracted message parameter information may be used when querying a database (such as translation system database 102C, for example) to ascertain the format desired by the intended recipient.

In some example implementations of block 308, transforming the requirements associated with the request data object into the predetermined format associated with the intended recipient comprises generating an audible message file by applying text-to-speech protocol to the requirements associated with the request data object. Such an approach may be particularly beneficial when an intended recipient prefers to receive information associated with incoming requests over the phone. In some example implementations of block 308, transforming the requirements associated with the request data object into the predetermined formation associated with the intended recipient includes causing representations reflecting the requirements to be arranged in a predetermined region of a human-readable electronic message. Some such example implementations contemplate translating alphanumeric codes and/or other text associated with a request into a particular arrangement of elements. For example, an intended recipient may have a structured form that, when populated and presented to a viewer, categorizes, groups, or otherwise lays out request elements such that they can be readily responded to by the response system associated with the intended recipient. Such example implementations may be particularly advantageous when an intended recipient prefers to receive incoming request requirements as an email, fax, or other electronic message, and wishes to ensure that all of the requirements of the received requests can be discerned and addressed. Some example implementations of block 308 contemplate translation in a manner that will allow for communication via an Eat-a-Bit or POS system associated with a restaurant.

As shown in block 310, the apparatus 200 is also capable of generating a notification object, wherein the notification object comprises the translated message payload information. Some example implementations of block 310 involve taking the translated message payload information, and containing it in a structure that can be readily transmitted to an intended recipient in accordance with the intended recipient's preferred electronic communication method. As such, in some examples, implementations of block 310 involve automatically generating email correspondence, an audio file, and/or a fax message.

As shown in block 312, the apparatus is also capable of transmitting the notification object to the intended recipient via the first electronic communication method. As noted herein, the apparatus 200 and/or a related system, such as the translation system 102, may be capable of engaging in electronic communication in accordance with a wide range of technologies and protocols, such that the apparatus can accommodate the intended recipient and/or their related system by using the previously identified and/or preferred electronic communication method.

With reference to blocks 314-320, the apparatus may be optionally configured to perform additional steps, including but not limited to the optional operations shown in dashed lines in FIG. 3. Some example implementations of such blocks may be particularly advantageous in providing error detection, and/or the generation of a user interface.

As shown at block 314, the apparatus is optionally capable of receiving an indication of an acceptance status of the notification object. Some example implementations contemplate structuring a notification object to require and/or enable a response by the recipient upon receipt of the notification object. For example, additional audio on an audible file may prompt the recipient to press one or more buttons on the phone upon receipt of the notification object. In some example implementations, email correspondence may have a selectable button included, such that pressing the button acknowledges receipt of the notification object, for example. However, it will be appreciated that any approach to determining an acceptance status of a notification object may be used, including but not limited to monitoring data traffic coming into and/or out of a system associated with an intended recipient, separately prompting the recipient for a response, or any other approach.

As shown in block 316, the apparatus is optionally capable of generating a renderable object associated with the message object, the notification object, and the indication of the acceptance status of the notification object. In some example implementations, block 316 provides for the generation of an interface that is capable of displaying to a viewer important information, such as what the request entailed, when, to whom, and how the notification was sent and whether not it can be determined whether the notification object was received. As such, one or more renderable objects associated with this information and/or any other relevant information to be displayed, can be generated in implementations of block 316.

As shown at block 318, the apparatus 200 is optionally capable of transmitting a control signal causing the renderable object to be displayed on a user interface as a set of selectable objects. As discussed in more detail with respect to the example interface 400 in FIG. 4, a user interface may be generated such that selectable elements associated with each notification object (and/or the related message object and/or request data object) may be presented to a user, such that selecting one of the selectable objects causes the user to be presented with additional information (and/or be directed to portals associated with such additional information) regarding the notification object associated with the selected object.

As shown at block 320, the apparatus is optionally capable of detecting an error condition associated with the acceptance status of the notification object. Any approach to detecting an error may be used in connection with implementations of block 320, including but not limited to the receipt of error indications (such as contact from intended recipients regarding the non-receipt or otherwise improper receipt of notification object, for example), the determination of error conditions based on time-out conditions or other detected issues with a network service provider and/or the non-receipt of delivery confirmations from intended recipients. For example, telephonic calls may include a prompt for a recipient to press a button to confirm receipt. Likewise, an email message may include selectable button or other feature that can be selected by a recipient to confirm receipt.

As shown in block 322, the apparatus 200 is optionally capable of, based at least in part on detecting the error condition associated with the acceptance status of the notification, transmitting the notification object to the intended recipient via the second electronic communication method. Some example implementations of block 322 contemplate attempting to use an alternate communication method to transmit notification objects in situations where an error condition is associated with the first electronic communication method FIG. 4 depicts an example user interface 400 that may be used in accordance with example implementations of embodiments of the invention disclosed herein, including but not limited to process 300. The interface 400 may be presented on, for example, a mobile device such as a mobile phone and/or any the other mobile devices described and/or contemplated herein, or on any other display, such as a monitor or other display associated with object translation server 102B and/or any other device capable of interfacing with object translation system 102. Many particularly advantageous implementations of embodiments of the invention, some of which relate to the user interface 400, arise in the context of systems and network environments that are aimed at fulfilling request parameters associated with request data objects that seek to cause the movement of goods, materials, and/or other resources from one location to another. Some such implementations and situations contemplate the online ordering of food for subsequent delivery. As such, some of the examples presented herein include details that are directed to such contexts. However, it will be appreciated that such details are presented herein for the purpose of clarity and to otherwise facilitate the understanding of some of the concepts and aspects of the invention disclosed herein, and are not intended to confine the invention or any embodiments thereof to any single context or situations.

As shown in FIG. 4, the interface 400 includes a set of selectable elements 402, which are individually shown as 402A-402D, each of which is associated with a notification object (and therefore a related message object and request data object). As shown in FIG. 4, each selectable element 402A-402D in the set of selectable elements 402 includes a set of selectable element fields 404-410. In example implementations that involve the interface 400 being presented to a viewer who desires to monitor and/or address error conditions associated with notification objects, each of the selectable elements 402A-D may be associated with a notification object, (such as, in the case of a system involving requesting food deliveries from restaurants, each selectable element 402A-D may be associated with an in-process and/or unassigned food order) for example.

Each individual selectable element field 404-410 for a given selectable element 402 may each present a category of information related to a notification object, such as a unique identifier, a time at which the notification object was sent, a time at which a message object was received by the system, the geographic region associated with the intended recipient, an identification of the intended recipient, depictions (such as check marks or other graphic representations, for example) of whether a notification object was confirmed as received by an intended recipient, an indication of whether an error condition is detected, a description of a detected error condition, notes regarding a notification object or other object, and/or other indicia associated with notification objects that are scheduled to be transmitted to their intended recipients and/or have recently been transmitted to their intended recipients, In some example implementations of interface 400, the selectable element fields 404-410 may include, but is not limited to, information presented in text, graphic, and/or other visual form that provides information about the particular selectable element 402. In some example implementations of interface 400, the set of selectable element fields 404-410 may include one or more "buttons" or other regions of the interface that a user may select to trigger a further action of the interface. For example, a user may press or otherwise provide an indication to the selectable element field 406 that causes a complete and/or otherwise expanded set of information associated with the particular selectable element 402 to be presented on the user interface 400, such as in viewing area 412, for example.

As discussed elsewhere herein, some example implementations of embodiments of the invention contemplate detecting error conditions associated with a notification object and/or other object, and providing an indication of the error condition on the interface. Any of the error conditions described or otherwise contemplated herein, including but not limited to error conditions associated with detecting that a notification object has not been received may trigger the presentation of an indication of an error condition on the interface 400, such as in viewing area 412, for example, and/or on or as part of the particular interface element associated with the error condition. Moreover, it will be appreciated that one or more error conditions, and the parameters thereof, may be specific to an individual intended recipient (and related system), as well as the precise contexts, situations, and environments in which the notification objects and systems operate.

Regardless of the precise nature of the error condition and/or the context in which it arises, an indication of the error condition may be rendered on the interface 400. For example, in some situations, it may be advantageous to change a color of the selectable element 402A-402D that is associated with the error condition. For example, a selectable element may be turned to red in the case of an error. Some implementations contemplate a color coding system based on the severity of the error condition, such that yellow, for example indicates a relatively minor condition, while orange and red may be used, for example to indicate error conditions of moderate and/or greater severity.

In some situations, in may be advantageous to add a button and/or rename a button associated with a selectable element field 404-410, to alert a user that an error condition exists. Upon selection of such a button, the interface area 414 may be populated with information about the error condition, and presented to the user via the interface. In some example implementations, interface area 414 may present to the user an image of an aspect of a notification object. For example, if an error condition was detected in connection with the notification object associated with element 402B, the selectable element field 408B may be adjusted such that, upon selection of the button at 408B, communication interface 414 is presented on the interface 400, and copy of email correspondence sent with a notification object is presented on the interface 400.

Some example implementations of interface 400 arise in contexts where an operator may make adjustments to the interface 400 and/or the related notification objects. For example, an operator may, upon noticing an indication that an attempt to send a notification object via one communication method has failed, provide instruction via the interface 400 to send the notification object via a second communication method. In some such example implementations, the selectable element fields 404-410 may include buttons which allow the user to selectively perform such an operation and/or any other operations that the operator and/or underlying system are authorized to perform, such as cancelling a request received in connection with a message object. In some example implementations, selecting any of the selectable element fields may cause particularized interfaces to be superimposed on the interface 400 that allow the user to confirm their selection and/or enter or otherwise import information to be used in editing or altering an element.

In some example implementations color coding and/or temporary adjustments to the color coding of elements rendered on the interface 400 may be used to assist a user in monitoring one or more notification objects and/or intended recipient systems. For example, when a user selects an element 402A-402D that is associated with a particular intended recipient, any one of the elements 402A-402D that is associated with the same intended recipient may be rendered in a different color to reflect the association between the various notification objects It will be appreciated that, although the depicted interface 400 only displays the selectable elements 402, the selectable element fields 404-410, and the additional interface elements 412 and 414, it is within the scope of this invention to transmit and/or display any information communicated to and from the interface 400 and any related systems, including but not limited to an object translation system, and/or any other system that is capable of communicating with the interface 400.

As noted above, some particularly advantageous implementations of embodiments of the invention contemplate the online ordering of food for subsequent delivery. As such, a discussion of such an example is presented below, which includes details that are directed to a restaurant context. However, it will be appreciated that such details are presented herein for the purpose of clarity and to otherwise facilitate the understanding of some of the concepts and aspects of the invention disclosed herein, and are not intended to confine the invention or any embodiments thereof to any single context or situations.

In an implementation involving an online restaurant order, an order may be placed by a customer via the Internet, through user input on a mobile device or other computing device, for example. A Restaurant Order Manager application (e.g., an implementation of translation system 102) then generates an underlying order number and securely presents that number to the restaurant via email, phone, fax, or the like. Concurrent with notifying the restaurant of the placed order, an automated call may alert the restaurant of the order to confirm that the restaurant has received the order. For example, an automated call may request that the merchant press "1" to indicate that the order is received. The order is stored together with the order number and attempted notification information in a data table maintained by the server. The Restaurant Order Manager application monitors the status of the order and may detect circumstances where an order has failed to be confirmed by the restaurant, whether due to a lack of confirmation (e.g., no one answers the automated call), or an error condition on the outgoing communication (e.g., a busy signal on the fax line, a fax machine that is out of toner, a full inbox on an email server or voicemail server, or the like). In one example, the result of such monitoring may indicate a fax machine failure status with an error code. The error code may indicate that a fax machine software suite or API is indicating that the receiving fax machine is offline, out of toner, or has a busy signal. Some implementations may attempt to resend the fax twice, and error logs are collected by the system.

Upon entering a failure state, the system may store the failure status in the order data table, and a monitoring application may detect the error state. In response, the monitoring application may update a GUI to indicate that the order has an error, such as by marking the order in red. Marking an order as failed within the GUI may also enable an interface control that, when selected, causes a telephone call (e.g., from a customer service representative station) to be initiated to the restaurant. Marking the order as failed may also trigger an outgoing communication (e.g., an email) or enable an interface control that triggers an outgoing communication to the consumer who placed the order, letting them know that their order is delayed. In yet further implementations, detection of an error may enable an interface control to initiate a chat window or chat session between the restaurant and a customer service representative via a restaurant computing device, such as a desktop, laptop, or mobile device associated with the merchant.

In some implementations, triggering of a failure state for an order for a particular restaurant may also prevent future orders from being sent to that restaurant until the failure state is cleared. Accordingly, triggering of the failure state may cause online ordering interfaces to disable the ability to place orders with the restaurant in a failure state until the failure state is cleared.

During a failure state, a customer service representative may notify the restaurant of the error state (e.g., the failed fax machine) while the system temporarily puts the restaurant on the failure list putting the restaurant offline until the failure is resolved and the restaurant is in a good state to receive and process orders. The system may also notify customers with pending orders of the order delays.

The computer system may further include a way to display all notifications or only fax notifications for a particular restaurant based on market type.

As described above, FIG. 3 illustrates a flowchart of an apparatus, such as apparatus 200, a method, and a computer program product according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 204 of an apparatus employing an embodiment of the present invention and executed by the processor 202 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising a processor and a memory, the memory comprising instructions that configure the apparatus to:

receive a message object associated with a request data object;

extract from the message object a set of message payload information and a set of message parameter information, wherein the set of message payload information comprises a set of requirements associated with the request data object and wherein the set of message parameter information comprises one or more intended recipient properties associated with an intended recipient of the message object;
based at least in part on the extracted set of message parameter information, translate the message payload information, wherein translating the message payload information comprises transforming the requirements associated with the request data object into a predetermined format associated with the intended recipient;
generate a notification object, wherein the notification object comprises the translated message payload information; and
transmit the notification object to the intended recipient via the first electronic communication method.

2. The apparatus of claim 1, the memory further comprising instructions that configure the apparatus to:
receive an indication of an acceptance status of the notification object;
generate a renderable object associated with the message object, the notification object, and the indication of the acceptance status of the notification object; and
transmit a control signal causing the renderable object to be displayed on a user interface as a set of selectable objects.

3. The apparatus of claim 2, wherein the set of message parameter information further comprises:
a unique message identifier;
a time parameter associated with the request data object; and
an identification of a second electronic communication method associated with the intended recipient.

4. The apparatus of claim 3, the memory further comprising instructions that configure the apparatus to:
detect an error condition associated with the acceptance status of the notification object.

5. The apparatus of claim 4, the memory further comprising instructions that configure the apparatus to:
based at least in part on detecting the error condition associated with the acceptance status of the notification object, transmit the notification object to the intended recipient via the second electronic communication method.

6. The apparatus of claim 1, wherein transforming the requirements associated with the request data object into the predetermined format associated with the intended recipient comprises generating an audible message by applying a text-to-speech protocol to the requirements associated with the request data object.

7. The apparatus of claim 1, wherein transforming the requirements associated with the request data object into the predetermined format associated with the intended recipient comprises causing representations reflecting the requirements to be arranged in a predetermined region of a human-readable electronic message.

8. The apparatus of claim 1, wherein the set of message parameter information comprises:
an identification of an intended recipient;
an indication of a geographic location associated with the intended recipient; and an indication of a first electronic communication method associated with the intended recipient.

9. The apparatus of claim 1, wherein the instruction further comprise the memory to store the extracted set of message payload information and the extracted set of message parameter information in a message data table.

10. A computer program product comprising at least one non-transitory computer-readable storage medium having computer-executable program code instruction stored therein, the computer-executable program code instructions comprising program code instructions configured to:
receive a message object associated with a request data object;
extract from the message object a set of message payload information and a set of message parameter information, wherein the set of message payload information comprises a set of requirements associated with the request data object and wherein the set of message parameter information comprises one or more intended recipient properties associated with an intended recipient of the message object;
based at least in part on the extracted set of message parameter information, translate the message payload information, wherein translating the message payload information comprises transforming the requirements associated with the request data object into a predetermined format associated with the intended recipient;
generate a notification object, wherein the notification object comprises the translated message payload information; and
transmit the notification object to the intended recipient via the first electronic communication method.

11. The computer program product of claim 10, wherein the computer-executable program code instructions further comprise program code instructions configured to:
receive an indication of an acceptance status of the notification object;
generate a renderable object associated with the message object, the notification object, and the indication of the acceptance status of the notification object; and
transmit a control signal causing the renderable object to be displayed on a user interface as a set of selectable objects.

12. The computer program product of claim 11, wherein the set of message parameter information further comprises:
a unique message identifier;
a time parameter associated with the request data object; and
an identification of a second electronic communication method associated with the intended recipient.

13. The computer program product of claim 12, wherein the computer-executable program code instructions further comprise program code instructions configured to:
detect an error condition associated with the acceptance status of the notification object.

14. The computer program product of claim 13, wherein the computer-executable program code instructions further comprise program code instructions configured to:
based at least in part on detecting the error condition associated with the acceptance status of the notification object, transmit the notification object to the intended recipient via the second electronic communication method.

15. The computer program product of claim 10, wherein transforming the requirements associated with the request data object into the predetermined format associated with the intended recipient comprises generating an audible message by applying a text-to-speech protocol to the requirements associated with the request data object.

16. The computer program product of claim 10, wherein transforming the requirements associated with the request data object into the predetermined format associated with the intended recipient comprises causing representations reflecting the requirements to be arranged in predetermined regions of a human-readable electronic message.

17. A method for managing the translation and transmission of machine-generated messages, the method comprising:
   receiving a message object associated with a request data object;
   extracting from the message object a set of message payload information and a set of message parameter information, wherein the set of message payload information comprises a set of requirements associated with the request data object and wherein the set of message parameter information comprises one or more intended recipient properties associated with an intended recipient of the message object;
   based at least in part on the extracted set of message parameter information, translating the message payload information, wherein translating the message payload information comprises transforming the requirements associated with the request data object into a predetermined format associated with the intended recipient;
   generating a notification object, wherein the notification object comprises the translated message payload information; and
   transmitting the notification object to the intended recipient via the first electronic communication method.

18. The method of claim 17, the method further comprising:
   receiving an indication of an acceptance status of the notification object;
   generating a renderable object associated with the message object, the notification object, and the indication of the acceptance status of the notification object; and
   transmitting a control signal causing the renderable object to be displayed on a user interface as a set of selectable objects.

19. The method of claim 18, wherein the set of message parameter information further comprises:
   a unique message identifier;
   a time parameter associated with the request data object; and
   an identification of a second electronic communication method associated with the intended recipient.

* * * * *